June 28, 1966  B. T. BERNSTEIN  3,258,759
HUMIDITY DETECTOR
Filed June 25, 1963

INVENTOR
Benjamin T. Bernstein
BY *Eli Weiss*
ATTORNEY

United States Patent Office 3,258,759
Patented June 28, 1966

3,258,759
HUMIDITY DETECTOR
Benjamin T. Bernstein, Metuchen, N.J., assignor to American Radiator & Standard Sanitary Corporation, New York, N.Y., a corporation of Delaware
Filed June 25, 1963, Ser. No. 290,359
19 Claims. (Cl. 340—235)

This invention relates generally to a humidity sensitive device and more particularly to a solid electrolyte type of cell sensitive to humidity.

Humidity detectors currently being used depend upon the change of such physical properties as dielectric constant, dimension, electrical conductivity or weight as a function of the relative humidity of the atmosphere. Many humidity detectors now in use depend upon the change in length of hair and other natural polymeric material.

It is an object of this invention to provide a device which generates an electrical signal that is a function of humidity.

It is another object of this invention to provide a device which generates a signal that is of sufficient magnitude to permit direct use without requiring amplification.

It is still another object of this invention to provide a device which generates a signal having a relatively large differential as the relative humidity varies from zero to one hundred percent.

It is also an object of this invention to provide a device which has a relatively long life.

It is an additional object of this invention to provide a device which is highly resistant to shock, vibration and centrifugal force.

It is a further object of this invention to provide a device which is reliable in operation and economical to build.

Other objects and many of the attendant advantages of this invention will be readily appreciated as the apparatus becomes better understood by reference to the following detailed description when considered in connection with the accompanying drawings wherein.

Similar reference characters refer to similar parts throughout the several figures of the drawing.

Briefly, in this invention, dielectric means is positioned between a first electrode means and a second electrode means—the first means being composed of a metal different from that of the second electrode means. Now, if electrical contact is made to the first electrode means and the second electrode means through an indicating means such as a meter, a signal having a magnitude which varies with humidity at temperatures between zero and one hundred degrees centigrade will be indicated by the meter.

Figure 1:
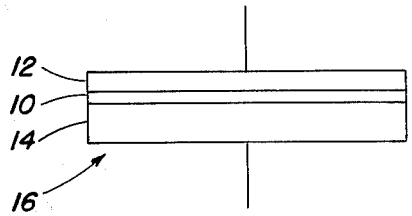
FIGURE 1 is a sectional view of a solid state humidity sensitive cell in accordance with the principles of this invention.

With reference to FIG. 1, there is disclosed structure in accordance with the principles of the invention. A dielectric water permeable means 10 is positioned between a first electrode means 12 and a second electrode means 14—the first electrode means being composed of a metal that is different from that of the second electrode means. In practice it was found that the first and second electrode means can be composed of aluminum, iron, tantalum, molybdenum, gold, silver, copper and the like; and that the dielectric means can be composed of non-metallic material such as anodized aluminum, fused silica, vitreous enamel, polymers, plastics, and the like.

The first 12 and second 14 electrode means are chemically and/or physically coupled to the dielectric means 10.

Now, by coupling the terminals of a meter between the first and second electrode means, a signal will be indicated which is a function of humidity.

In one application the humidity sensitive solid state cell 16 comprises an aluminum plate 14 having a polyvinyl alcohol surface 10 approximately 0.005 cm. thick. The surface 10 can be obtained by dipping the aluminum in a solution of polyvinyl alcohol and water, followed by drying. Naturally, one side of the aluminum plate 14 is treated by washing or the like to prevent the polyvinyl alcohol from covering completely the aluminum plate. A coating 12 is then evaporated onto the polyvinyl alcohol plastic surface. This structure, which is identified as cell 16 in the figures, generates a signal which is moisture controlled and extremely humidity sensitive. The direction of current flow through an external circuit connected to cell 16 is from the silver electrode 12 to the aluminum electrode 14.

A vitreous enamel, an anodized film, a plastic or other polymers can be used in place of the polyvinyl alcohol. Naturally, when this substitution is made, the use of other bonding procedures may become necessary.

In operation it was found that with changes from zero to one hundred percent in relative humidity, the current density changed by approximately four orders of magnitude, and the voltage generated showed an increase of a few hundred millivolts. Furthermore, it is important to note that there is measurable potential and current flow at 0% relative humidity which is probably due to adsorbed water.

Additionally, good results were also obtained by replacing the evaporated silver electrode with a vapor deposited on plated gold electrode.

Furthermore, it has been dscovered that by using a source of D.C. potential as a bias means for the humidity sensitive solid state cell, the current generated can be increased.

Figure 2:
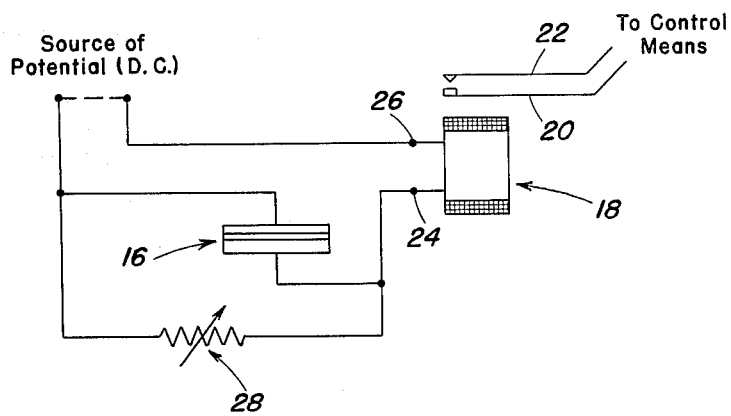
FIGURE 2 is a schematic diagram of a humidity sensitive and indicating control device in accordance with the principles of the invention.

With reference to FIG. 2 there is disclosed a humidity sensitive and control device in accordance with the principles of this invention. A switching means 18 such as a relay 18 having a fixed contact 20 and a movable contact 22 supports two winding terminals 24 and 26. Terminal 26 is connected directly to a source of D.C. potential and terminal 24 is coupled to the source of D.C. potential through an impedance 28 which can be adjusted to a desired value. A humidity sensitive solid state cell 16 is connected in shunt with the impedance 28.

In this application, current through the relay winding is determined by the current through the humidity sensitive solid state cell 16. The presence of a variable impedance 28 permits the adjustment or control of humidity over a wide range. For example, the impedance 28 is adjusted until the relay 18 is almost ready to be actuated. Now, any change in relative humidity will cause the cell 16 to generate an increased amount of current which will cause the relay to be actuated. This occurs because the current that flows through the relay winding is equal to the current that flows through the impedance 28 and also through the cell 16. Thus, the amount of current that must be generated by the cell 16 to actuate the relay 18 is determined by the current that flows through the impedance 28 and, therefore, by the setting of the impedance 28. Therefore, with this arrangement it is possible to calibrate the adjustable impedance 28 to permit the humidity level at which the relay 18 is actuated to be hand set or "dialed."

The contacts 20, 22 are coupled to appropriate equipment to permit the activation and deactivation of humidifier and dehumidifier equipment.

In these instances where it is possible to use a sensitive relay—that is, a relay which can be activated by a very small amount, then the source of D.C. potential used to precondition the relay will not be required. In this instance the two terminals are removed from the source of D.C. potential and coupled together as indicated by the dotted line; and the operation by means of the impedance 28 remains the same as described.

Figure 3:
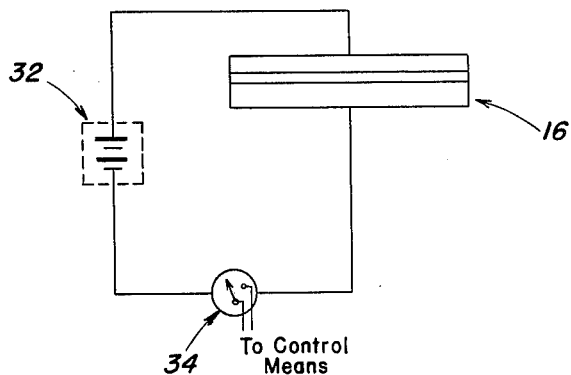
FIGURE 3 is a schematic diagram of a humidity sensitive and indicating device in accordance with the principles of the invention.

Now, with reference to FIG. 3, there is disclosed structure in accordance with the principles of this invention used to indicate directly relative humidity. The cell 16 is coupled in series with an indicating means 34 such as an ammeter or the like. If the ammeter is not sensitive enough to be activated by the current generated by the cell 16, then a source of D.C. bias potential 32 is connected in series with the cell to increase the magnitude of the signal generated. The indicating means is calibrated to indicate directly relative humidity. It has been found that the current fed to the indicating means 34 is approximately 100 microamps, as a function of relative humidity without the use of a D.C. bias source.

In operation, the cell 16 is positioned in an area which can be either in close proximity or remote from the indicating means. To determine the relative humidity of the area within which the cell is located it is only necessary to read the indicating means.

In most instances the indicating means 34 is designed to give full scale deflection for 100% relative humidity. However, this is a matter of choice and a meter which provides any desired deflection at 100% relative humidity can be used.

If desired, a meter which contains make-break electrical contacts can be used. In this manner, not only will there be a direct reading of the level of the relative humidity—but the electrical contacts can be connected to desired equipment for activation and deactivation thereof. Additionally, by using a meter which has adjustable contacts, it is possible to predict various values of relative humidity required to activate desired equipment.

Obviously, many modifications and variations of the present invention are possible in the light of the above teachings. It is, therefore, to be understood that within the scope of the appended claims the invention may be practiced otherwise than as specifically described.

What is claimed is:

1. A device having a voltage characteristic directly proportional to the ambient humidity which generates a signal comprising a first electrode, a second electrode of material different than said first electrode, and water permeable dielectric means being substantially free of an electrolyte interposed between said first electrode and said second electrode.

2. A device having a voltage characteristic directly proportional to the ambient humidity which generates a signal comprising a first electrode composed of a first metal, a second electrode compound of a second metal, and dielectric water permeable means being substantially free of an electrolyte interposed between said first electrode and said second electrode.

3. The combination of claim 2 wherein said dielectric means comprises an anodized film.

4. The combination of claim 2 wherein said dielectric means comprises vitreous enamel.

5. The combination of claim 2 wherein said dielectric means comprises non-conducting fused silica.

6. The combination of claim 2 wherein said dielectric means comprises non-conducting plastics.

7. The combination of claim 2 wherein said dielectric means comprises non-conducting polymers.

8. A device having a voltage characteristic directly proportional to the ambient humidity which generates a signal comprising a first electrode of aluminum, a second electrode of gold, and a dielectric water permeable means being substantially free of an electrolyte interposed between said first and second electrodes.

9. A device having a voltage characteristic directly proportional to the ambient humidity which generates a signal without requiring the use of an electrolyte comprising a first electrode of aluminum, a second electrode of gold, and an anodized film interposed between said first and second electrodes.

10. A device having a voltage characteristic directly proportional to the ambient humidity which generates a signal comprising a first electrode of aluminum, a second electrode of gold, and a non-conducting polymer being substantially free of an electrolyte interposed between said first and second electrodes.

11. A device having a voltage characteristic directly proportional to the ambient humidity which generates a signal comprising a first electrode of aluminum, a second electrode of gold, and polyvinyl alcohol being substantially free of an electrolyte interposed between said first and second electrodes.

12. A device having a voltage characteristic directly proportional to the ambient humidity which generates a signal comprising a first electrode of aluminum, a second electrode of gold, and non-conducting plastic being substantially free of an electrolyte interposed between said first and second electrodes.

13. A device having a voltage characteristic directly proportional to the ambient humidity sensitive to humidity comprising a cell having a first electrode composed of a first metal, a second electrode composed of a second metal, water permeable dielectric means being substantially free of an electrolyte interposed between said first and second electrodes, and an indicating means fed by said cell.

14. A device having a voltage characteristic directly proportional to the ambient humidity sensitive to humidity comprising a cell having a first electrode composed of a first metal, a second electrode composed of a second metal, water permeable dielectric means being substantially free of an electrolyte interposed between said first and second electrodes, an indicating means fed by said cell, and a source of D.C. bias potential interposed between said cell and said indicating means.

15. A device sensitive to humidity comprising a relay, a source of potential coupled to feed a signal to said relay, impedance means interposed between said source of potential and said relay to limit the signal fed to said relay to a desired level not sufficient to actuate said relay, and a cell connected in parallel with said impedance means having a first electrode composed of a first metal, a second electrode composed of a second metal, and a water permeable dielectric means being substantially free of an electrolyte interposed between said first and second electrodes said cell coupled to feed a generated signal to actuate said relay when the humidity reaches a predetermined value.

16. A device sensitive to humidity comprising a switching means, a source of potential coupled to bias said switching means, impedance means interposed between said switching means and said source of potential to control the magnitude of bias fed to said switching means to a desired level not sufficient to actuate said switching means, and a cell having a first electrode composed of a first metal, a second electrode composed of a second metal, and a water permeable dielectric means being substantially free of an electrolyte interposed between said first and second electrodes said cell coupled to feed a generated signal to actuate said switching means when the humidity reaches a predetermined value.

17. The combination of claim 16 wherein said impedance means comprises a variable resistor.

18. The combination of claim 16 wherein said first electrode of said cell is aluminum, said second electrode of said cell is gold, and said water permeable dielectric means of said cell is a plastic film.

19. A device sensitive to humidity comprising a relay having a fixed contact and a movable contact, terminals connected to a source of D.C. potential, a cell having a first electrode composed of a first metal, a second electrode composed of a second metal, and a water permeable dielectric means being substantially free of an electrolyte interposed between said first and second electrodes, and impedance means connecting said relay to said source of potential, said cell being connected in parallel with said impedance to limit the signal fed from the cell to the relay.

References Cited by the Examiner

UNITED STATES PATENTS

| | | | |
|---|---|---|---|
| 1,332,483 | 3/1920 | Bridge | 136—90 |
| 2,424,735 | 7/1947 | Boothroyd | 340—235 |
| 2,564,495 | 8/1951 | Mullen | 136—90 |
| 2,681,571 | 6/1954 | Becker | 340—235 X |
| 2,747,009 | 5/1956 | Kirkwood et al. | 136—153 |
| 2,962,897 | 12/1960 | Muller | 73—336.5 |
| 2,976,728 | 3/1961 | Brogan et al. | 73—336.5 |

OTHER REFERENCES

Nordberg, M. E.: "Properties of Some Vycor-brand Glasses," Journal of the American Ceramic Society, vol. 27, No. 10, October 1944, pp. 299–305.

Rindone, G. E. et al.: "Glasses as Electrolytes in Galvanic Cells," Journal of the American Ceramic Society, vol. 33, No. 3, March 1950, pp. 91–95.

Von Hippel, A.: Dielectric Materials and Applications, N.Y., Technology Press of MIT, 1954, page 178.

NEIL C. READ, *Primary Examiner.*

R. M. ANGUS, *Assistant Examiner.*